A. C. HEAP AND A. B. FIELD.
ACOUSTICALLY OPERATED ELECTRIC CONTACT ACTUATING MECHANISM AND SYSTEM EMPLOYING THE SAME.
APPLICATION FILED APR. 3, 1919.
1,310,568.
Patented July 22, 1919.
3 SHEETS—SHEET 2.
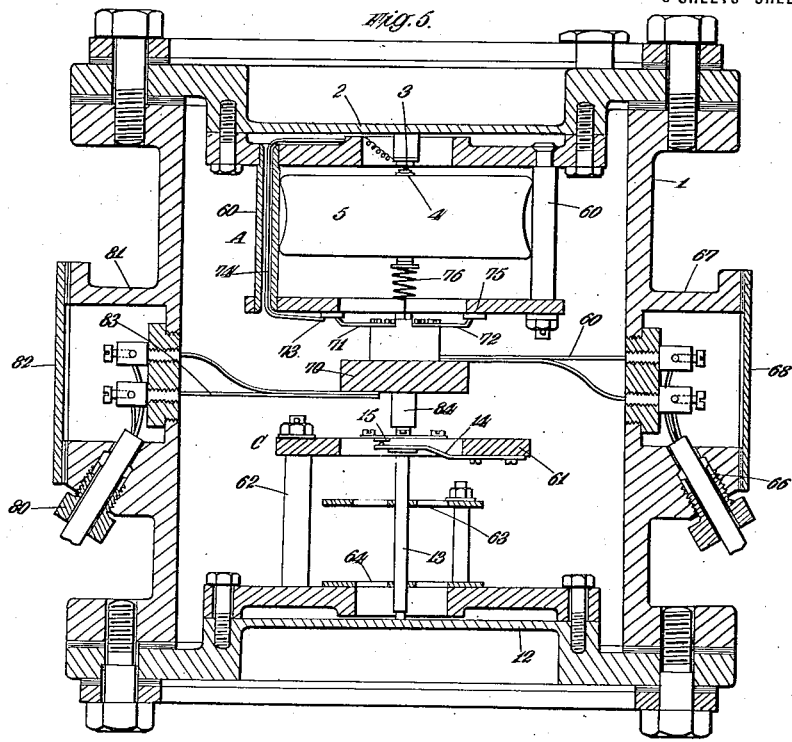
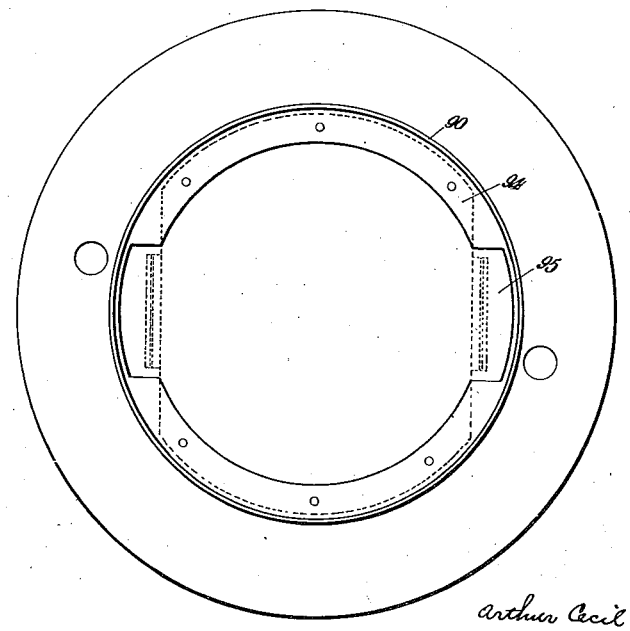

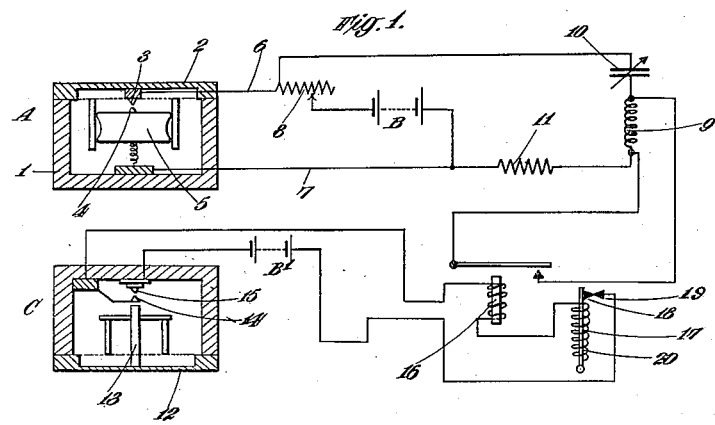
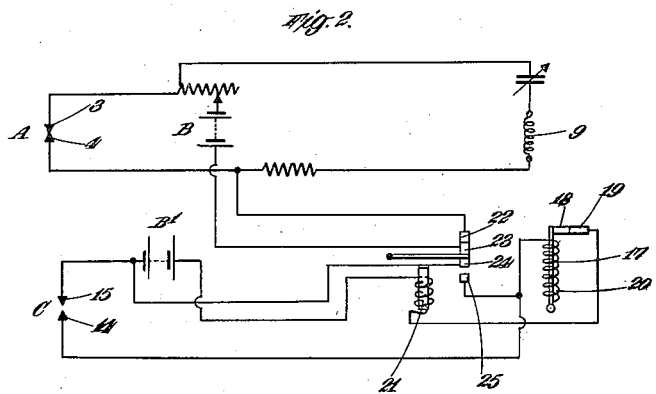
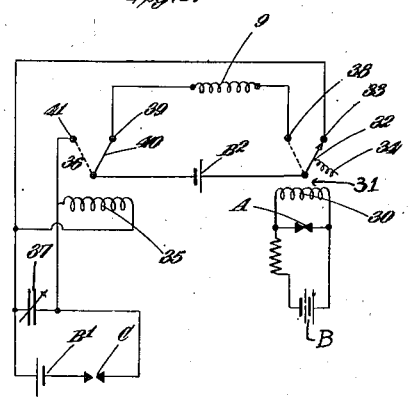
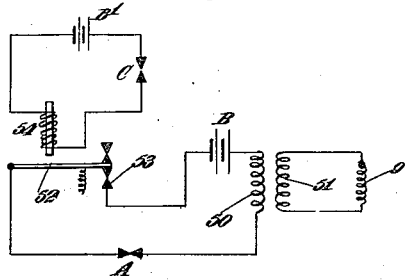

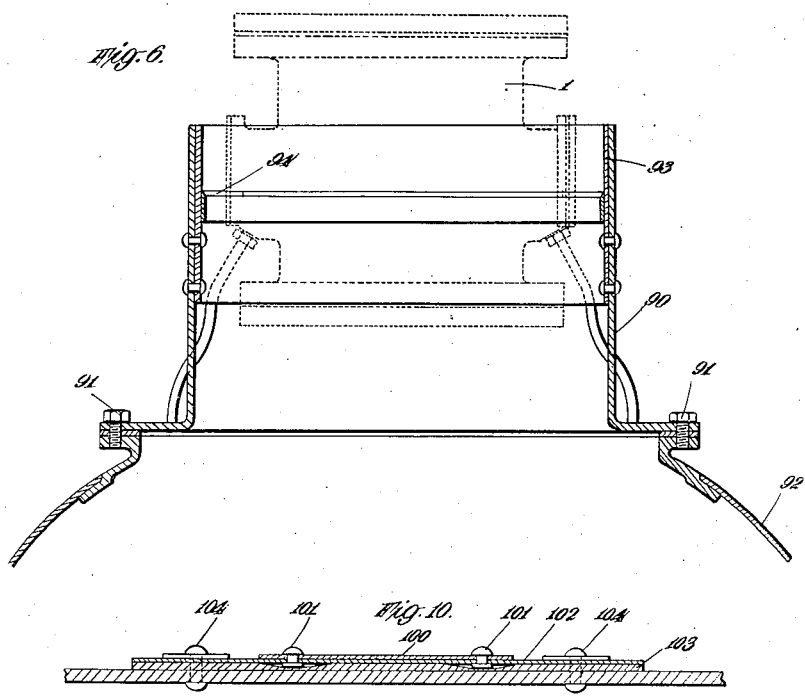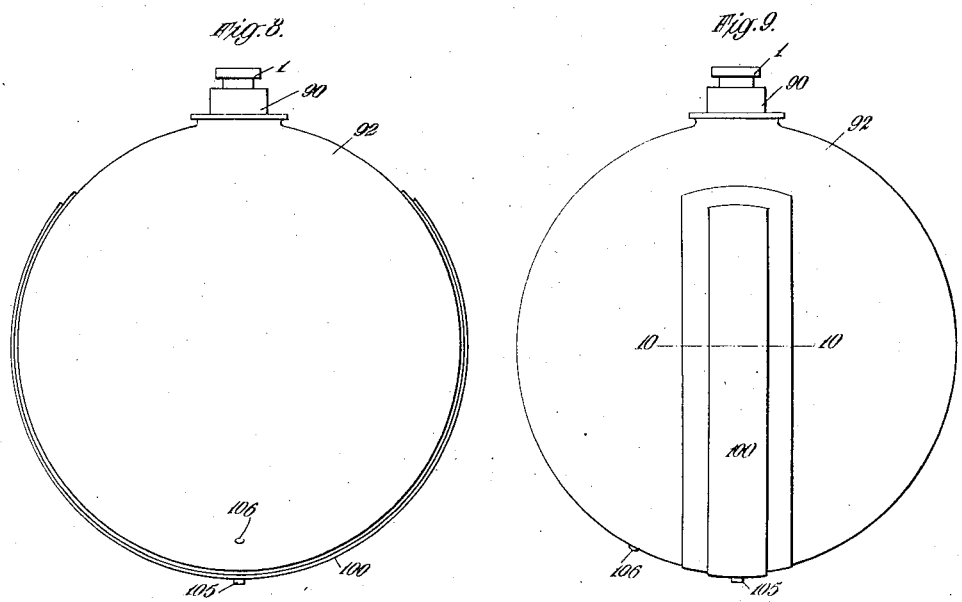

UNITED STATES PATENT OFFICE.

ARTHUR CECIL HEAP, OF WOKING, AND ALLAN BERTRAM FIELD, OF MARPLE, ENGLAND.

ACOUSTICALLY-OPERATED ELECTRIC-CONTACT-ACTUATING MECHANISM AND SYSTEM EMPLOYING THE SAME.

1,310,568.	Specification of Letters Patent.	Patented July 22, 1919.

Application filed April 3, 1919. Serial No. 287,349.

*To all whom it may concern:*

Be it known that we, ARTHUR CECIL HEAP and ALLAN BERTRAM FIELD, both subjects of the King of Great Britain, residing, respectively, at "Oatlands", Ashwood Road, Woking, England, and "Kingslea", Strines Road, Marple, Cheshire, England, have invented certain new and useful Improvements in or Relating to Acoustically-Operated Electric-Contact-Actuating Mechanism and Systems Employing the Same, of which the following is a specification.

This invention relates to electric contact actuating mechanism and systems employing the same and more particularly to such apparatus intended or adapted to be used for detecting sound waves or pulses transmitted through water and to systems employing the same.

The detecting apparatus may be associated with a submerged body such as a surface or under water mine and serve to cause the same to explode, or may be associated with a buoy or mine and serve to operate a signaling device carried thereon.

The device according to this invention is so constructed that it is only operated when it receives sound waves or pulses of a certain strength or character as for example those produced by the passage of a submarine in the vicinity of the buoy or mine, means being provided to prevent its operation when sound waves or pulses of a greater strength or different character are received as when heavy explosive charges are exploded in the vicinity.

According to this invention electric contact actuating apparatus adapted to be used for detecting sound waves or pulses of a predetermined strength or character comprises an electric contact adapted to be actuated by sound waves or pulses so as to control an electric circuit and also comprises a second electric contact adapted to be actuated, when sound waves or pulses of a strength or character different from that of the predetermined strength or character are received, to prevent the first contact from controlling the said electric circuit.

In order that the invention may be clearly understood and readily carried into effect the same will now be more fully described with reference to the accompanying drawings in which:—

Figure 1 shows a diagrammatic circuit arrangement containing an electrical contact device adapted to be operated by sound waves.

Fig. 2 shows a modification of the electrical circuit shown in Fig. 1, whereby one of the contact devices serves to open a circuit.

Fig. 3 is also a modification of the circuit arrangement of Fig. 1, in which relays are utilized to restore the circuits to normal operation after a time interval.

Fig. 4 shows a further modification of the circuit arrangement of Fig. 1, whereby one of the contact devices serves to open directly the circuit containing other contact devices.

Fig. 5 is a section of one constructional form of the apparatus adapted to be fixed to a mine.

Fig. 6 is a view in section of a fitting for use in attaching the apparatus shown in Fig. 5 to the mine.

Fig. 7 is a plan of the fitting shown in Fig. 6.

Figs. 8 and 9 are views of the mine taken in two directions at right angles and showing the construction of a sea water battery which may be employed, and Fig. 10 is a section on an enlarged scale taken on the line 10—10 in Fig. 9.

Referring to Fig. 1, A is an electric contact device which is adapted to be operated by sound waves. As diagrammatically indicated the said contact device comprises a receptacle 1 containing a liquid such as oil and closed at the top by a diaphragm or cover 2 carrying one of the electrodes 3. The other electrode 4 is carried on the upper face of a hollow float 5 and the apparatus thus forms a "dancing contact" device adapted to respond to sound waves. The electrodes 3 and 4 are connected in series with a battery B by means of the leads 6 and 7 and an adjustable resistance or impedance 8 is included in the circuit. Connected to the electrodes 3 and 4 is a circuit comprising the electro-thermic fuse 9, or any other electrically actuated device substituted therefor, to be operated, a variable condenser 10 and a resistance or impedance 11. On sound waves being received by the device A the resistance between the electrodes 3 and 4 is varied, thereby varying the potential difference between them. The potential difference at the terminals of the condenser 10 is therefore varied and a pulsating current passes through the device 9. To prevent the device 9 being operated in response to sound waves of a greater strength or different character from those which it is desired should cause its operation, a second contact device C is provided which comprises a diaphragm 12 adapted to move, by means of the stem 13, a contact 14 so as to make contact with a fixed contact 15 when sound waves of the greater strength are received on the diaphragm 12. On contact being made between the contacts 14 and 15 a circuit is closed from a battery B' through the winding of a relay 16 which latter serves to provide a by-path circuit around the device 9. As shown a time element device may be employed to open the circuit closed through the relay 16, after a predetermined interval of time, so that the device 9 can again operate. This device may consist of a bimetallic strip 17 carrying a contact 18 which normally makes contact with a fixed contact 19. A heating coil 20 surrounds the bimetallic strip 17 one end of this coil being connected to the strip and therefore to the contact 18. After the current has passed through the heating coil for the predetermined time, the contact 18 is separated from the fixed contact 19 thereby opening the circuit of the relay 16 and removing the short circuit from the device 9 so that the latter is again in a condition to be operated.

In the circuit arrangement shown in Fig. 2, two contact devices A and C are employed as in Fig. 1 but the device C serves to open the battery circuit instead of providing a by-path circuit around the fuse 9. When the contacts 14 and 15 of the device C are brought into contact, a circuit is closed from battery B' through contacts 15 and 14 of device C, heater coil 20 and contacts 18 and 19 of a thermal timing device, winding of a relay 21 back to battery B'. The relay 21, on operating, opens the circuit of the battery B at contacts 22 and 23 and provides a by-path circuit around the fuse 9. The device 9 is therefore prevented from operating until after the thermal timing device has separated the contacts 18 and 19, when the relay 21 deënergizes and the circuits are returned to normal.

In the arrangement shown in Fig. 3, the device A is arranged in parallel with the winding 30 of a relay 31. Normally the armature 32 of the relay 31 is held on the contact 33 by means of say a spring 34. The apparatus C is connected to the winding 35 of a polarized relay 36, a variable condenser 37 being connected in parallel with the winding. With the armature 32 of the relay 31 on contact 33, on sound waves being received, the armature 32 is moved to contact 38 thereby closing a circuit from battery B², armature 32, contact 38, fuse or other device 9, contact 39 and armature 40 of relay 36 back to the battery B². Therefore, when the device C is not operated the fuse 9 or any other electrically actuated device will be operated. If the device C is operated current flows from the condenser 37 through the winding 35 of the polarized relay 36 in such a direction that the armature 40 is moved on to contact 41, thereby preventing the circuit through the device 9 being closed. After the sound waves cease to be received the armature 32 of relay 31 is drawn back by the spring 34 on to the contact 33, thereby closing a circuit in the opposite direction through the winding 35 of the relay 36 and moving the armature 40 of this relay back on to the contact 39. The circuits are thus restored after a predetermined time depending on the time constants of the relays 31 and 36.

In the circuit arrangement shown in Fig. 4 the apparatus A serves to close a circuit through the primary winding 50 of a transformer to the secondary winding 51 of which the device 9 is connected. The circuit is closed through the armature 52 and contact 53 of a relay 54. The winding of the relay 54 is connected in circuit with the contact apparatus C so that if the latter is operated contact is broken at 53 and no current can be passed through the winding 50 of the transformer by the contact device A.

In all of the circuit arrangements hereinbefore described a single battery may be employed instead of the separate batteries B, B' and B².

Fig. 5 shows one construction of the devices A and C for use on a mine or buoy. Certain parts of the apparatus correspond to parts shown diagrammatically in Fig. 1 and similar reference numerals are employed to denote them. The apparatus comprises a cylindrical casing 1 closed at the top and bottom by diaphragms 2 and 12. The contact 3 is attached to diaphragm 2 and contact 4 to the float 5. The casing 1 contains oil so that the contact 4 presses on to the contact 3 with a pressure depending on the buoyancy of the float 5. The float is prevented from being displaced by shocks by means of rods 60 (two only of which are shown). The stem 13 of the device C is supported by and may be fixed to the diaphragm 12 and serves when raised to move the contact 14 into engagement with the fixed contact 15. The contacts 14 and 15 are supported on a frame 61 mounted on a pillar 62. The stem 13 is guided in its movement by plates 63 and 64. The leads for the device A are led through a gland 66 into a terminal box 67 formed on the side of the casing 1 and closed by the cover 68. Conductors 69 are led from the terminal box to a bar 70, these conductors being connected to two brushes 71 and 72. The brush 71 makes contact with a plate 73 from which a lead 74 passes through one of the rods 60, this rod being made hollow to permit of this. The lead 74 is connected to the contact 3. The brush 72 makes contact with a plate 75 from which a conductor passes through the spring 76, connection thereby being made to the contact 4. The object of this arrangement is to permit of the device A, with the contacts 73 and 75, being removed from the casing 1 without disturbing the connections from the brushes 71 and 72 to the terminal box 67. The leads for the device C are led through a gland 80 into a terminal box 81 closed by a cover 82. From the terminals, conductors 83 are led down the stem 84 on the part 70 to the contacts 14 and 15.

The apparatus comprising the devices A and C constructed as shown in Fig. 5 may be mounted on the mine or buoy as shown in Fig. 6. A cylindrical casing 90 is fastened by screws 91 over an opening in the mine casing 92. Riveted to the casing 90 is an internal sleeve 93 and attached to this sleeve is a ring 94 of L shaped section. The casing 1 shown in Fig. 5 is provided with a flange (not shown) about midway between its top and bottom. This flange rests on the ring 94 and is attached thereto by screws. The ring 94 is cut away at 95 and 96 to leave room for the terminal boxes 67 and 81 on the casing 1.

Current may be supplied to the devices A and C from a sea water battery. As shown in Figs. 8, 9 and 10 this battery may comprise as one element a copper strip 100 which partly encircles the mine body; the other element consists of the mine casing itself. As shown in Fig. 10 the copper plate 100 may be secured by rivets 101 to a sheet of treated canvas 102. The plate 100 and rivets 101 are insulated from the mine casing by a second sheet of treated canvas 103. The plate 100 is fixed to the mine casing by rivets 104 passing through the two sheets of canvas and the mine casing. Suitable terminals are provided for the plate 100 and for the mine casing at 105 and 106.

Instead of employing a sea water battery alone, suitable primary or secondary cells mounted in the mine casing, or a combination of such cells with a sea water battery, may be employed.

If the apparatus is associated with a mine, the closing of the operating circuit may serve to explode the mine, or if it is associated with a buoy having a signaling device thereon it may serve to cause the operation of the signal as hereinbefore referred to. The signaling device may be in the form of a siren or horn the controlling circuit serving to release compressed air to operate the same. The signals given by different buoys may be made distinctive by arranging that the signaling devices thereon give different signals, for example blasts according to the Morse code. The signals given out by the buoy are preferably of a character specifically different from the type of sounds being detected, which result may be obtained for instance by proportioning the relative duration of activity and silence or using a radically different frequency, so that the emission of a signal from one buoy cannot operate the receiving devices in neighboring buoys. The devices may be arranged, according to this invention, on the mines or buoys of a mine field, the mines having signaling devices thereon which give distinctive signals, as just referred to, according to the position of the particular mine or buoy in the mine field. Consequently if say a submarine attempts to pass through the mine field without coming in contact with the mines, the signals will be operated successively and an indication given of the course taken by the submarine.

By the use of the device on mines or buoys, the mines may be exploded or signals given by the buoy by transmitting sound waves or pulses through the water from a suitable station or ship.

Apparatus according to this invention may be employed for protecting ships against torpedo attack. For this purpose explosive mines may be supported in any suitable manner at a distance from the hull of the ship, these mines being provided with sound responsive devices of the kind forming the subject of the present invention, so that on the approach of a torpedo the mines are exploded. One object of providing means to delay the operation of the circuit to be controlled after the sound waves are first received, is to prevent the mines or signaling devices being operated until the submarine or torpedo has approached sufficiently near to the mine or buoy, to insure its being damaged by the explosion.

What we claim and desire to secure by Letters Patent of the United States is:—

1. Electric contact actuating apparatus adapted to be used for detecting sound waves or pulses of a predetermined strength or character comprising an electric contact adapted to be actuated by sound waves or pulses so as to control an electric circuit and also comprising a second electric contact adapted to be actuated, when sound waves of a strength or character different from that of the predetermined strength or character are received, to prevent the first contact from controlling the said electric circuit.

2. Electric contact actuating apparatus adapted to be used for detecting sound waves or pulses of a predetermined strength or character comprising an electric contact adapted to be actuated by sound waves or pulses impinging on a diaphragm so as to control an electric circuit and also comprising a second electric contact adapted to be actuated, when sound waves of a strength or character different from that of the predetermined strength or character are received, to prevent the first contact from controlling the said electric circuit.

3. In apparatus for the detection of sound waves, pulses or vibrations of a predetermined strength or character, the combination of an electrical contact controlling an electric circuit adapted to be actuated by said sounds, pulses or vibrations, with a second electrical contact controlling a second electric circuit adapted to be actuated by sound waves, pulses or vibrations of a different strength or character from said predetermined sounds, pulses or vibrations to prevent said first contact from controlling said first circuit.

4. In apparatus actuated by sound waves or pulses of a predetermined strength or character, an electric contact controlling an electric circuit containing a source of current, an electrically actuated device in said circuit, said contact actuated by a diaphragm upon which the said waves or pulses impinge, a second electric contact controlling a second electric circuit containing a source of current, and a second electrically actuated device in said second circuit, said second contact actuated by a diaphragm upon which sound waves or pulses of a different strength or character from said predetermined sounds or pulses impinge, said second device adapted to prevent said first contact from controlling said first circuit.

5. A mine adapted to be fired by sound waves or pulses of a predetermined strength or character, comprising an electric contact adapted to be actuated by said sound waves or pulses to control an electric circuit, and a second electric contact adapted to be actuated by sound waves or pulses of a different strength or character from said predetermined sounds or pulses to prevent said first contact from controlling the first circuit.

ARTHUR CECIL HEAP.
ALLAN BERTRAM FIELD.